United States Patent
Shet et al.

(10) Patent No.: US 9,117,147 B2
(45) Date of Patent: Aug. 25, 2015

(54) MARGINAL SPACE LEARNING FOR MULTI-PERSON TRACKING OVER MEGA PIXEL IMAGERY

(75) Inventors: Vinay Damodar Shet, Princeton, NJ (US); Dorin Comaniciu, Princeton Junction, NJ (US); Sushil Mittal, Highland Park, NJ (US); Peter Meer, East Brunswick, NJ (US); Cheng-Hao Kuo, Plainsboro, NJ (US)

(73) Assignees: Siemens Aktiengesellschaft, Munich (DE); Rutgers University, New Brunswick, NJ (US)

( * ) Notice: Subject to any disclaimer, the term of this patent is extended or adjusted under 35 U.S.C. 154(b) by 658 days.

(21) Appl. No.: 13/451,845

(22) Filed: Apr. 20, 2012

(65) Prior Publication Data
US 2012/0274781 A1    Nov. 1, 2012

Related U.S. Application Data

(60) Provisional application No. 61/480,520, filed on Apr. 29, 2011.

(51) Int. Cl.
*H04N 5/225* (2006.01)
*G06K 9/68* (2006.01)
(Continued)

(52) U.S. Cl.
CPC .............. *G06K 9/6857* (2013.01); *G06T 7/208* (2013.01); *G06T 2207/20081* (2013.01);
(Continued)

(58) Field of Classification Search
None
See application file for complete search history.

(56) References Cited

U.S. PATENT DOCUMENTS

2004/0263636 A1 * 12/2004 Cutler et al. .............. 348/211.12
2009/0296989 A1 * 12/2009 Ramesh et al. ............... 382/103

OTHER PUBLICATIONS

Yefeng Zheng, et al. "Fast Automatic Heart Chamber Segmentation From 3D CT Data Using Marginal Space Learning and Steerable Features," 2007, IEEE.
(Continued)

*Primary Examiner* — Frederick Bailey

(57) ABSTRACT

A method for tracking pedestrians in a video sequence, where each image frame of the video sequence corresponds to a time step, includes using marginal space learning to sample a prior probability distribution $p(x_t|Z^{t-1})$ of multi-person identity assignments given a set of feature measurements from all previous image frames, using marginal space learning to estimate an observation likelihood distribution $p(z_t|x_t)$ of the set of features given a set of multi-person identity assignments sampled from the prior probability distribution, calculating a posterior probability distribution $p(x_t|Z^t)$ from the observation likelihood distribution $p(z_t|x_t)$ and the prior probability distribution $p(x_t|Z^{t-1})$, and using marginal space learning to estimate the prior probability distribution $p(x_{t+1}|Z^t)$ for a next image frame given the posterior probability distribution $p(x_t|Z^t)$ and a probability $p(x_{t+1}|x_t)$, where the posterior probability distribution of multi-person identity assignments corresponds to a set of pedestrian detection hypotheses for the video sequence.

25 Claims, 8 Drawing Sheets

(51) Int. Cl.
*G06T 7/20* (2006.01)
*G08B 13/196* (2006.01)

(52) U.S. Cl.
CPC ............. *G06T 2207/30196* (2013.01); *G06T 2207/30232* (2013.01); *G06T 2207/30241* (2013.01); *G08B 13/19608* (2013.01)

(56) References Cited

OTHER PUBLICATIONS

Vinay Shet, et al., "Predicate Logic Based Image Grammars for Complex Pattern Recognition," pp. 1-19, International Journal of Computer Vision 2010.

Yuan Li, et al., Learning to Associate: Hybridboosted Multi-Target Tracker for Crowded Scene, pp. 2953-2960, 2009, IEEE.

Namrata Vaswani, et al., Particle Filters for Infinite (or Large) Dimensional State Spaces—Part 1, Department of Electrical and Computer Engineering, Iowa State University, Ames, IA 50011.

Namrata Vaswani, et al., Particle Filters for Infinite (or Large) Dimensional State Spaces—Part 2, Department of Electrical and Computer Engineering, Iowa State University, Ames, IA 50011.

Vinay D. Shet, et al., "Multivalued Default Logic for Identity Maintenance in Visual Surveillance," Computer Vision Laboratory, University of Maryland, College Park, MD.

Zhuowen Tu, Probabilistic Boosting-Tree: Learning Disbriminative Models for Classification Recognitition, and Clustering.

Yefeng Zheng, et al., Four-Chamber Heart Modeling and Automatic Segmentation for 3D Cardiac CT Volumes Using Marginal Space Learning and Steerable Features, pp. 1-14, IEEE Transactions on Medical Imaging.

Cheng-Hao Kuo, et al., "How Does Person Identity Recognition Help Multi-Person Tracking," pp. 1217-1224.

\* cited by examiner

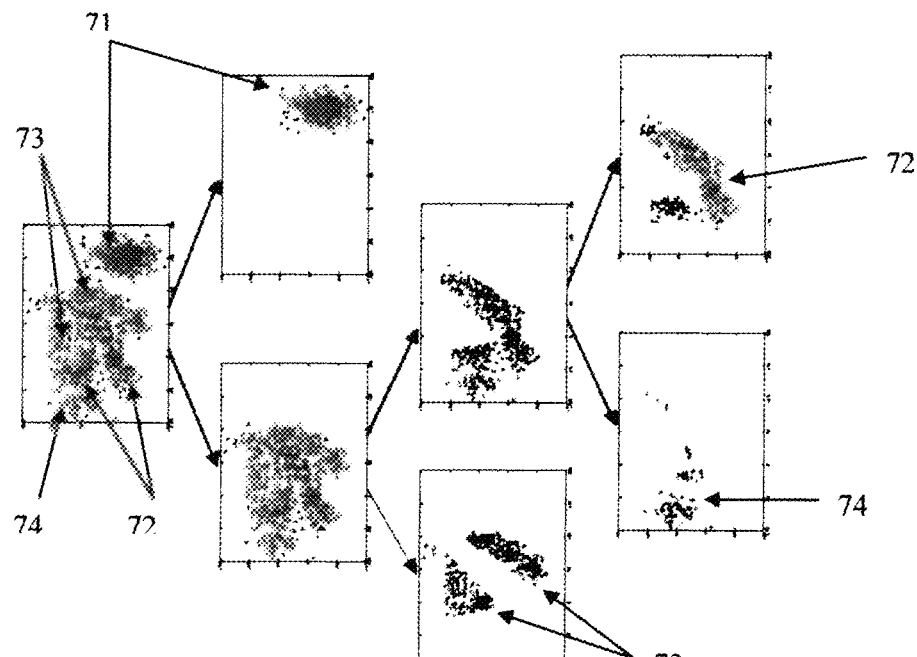
(a)
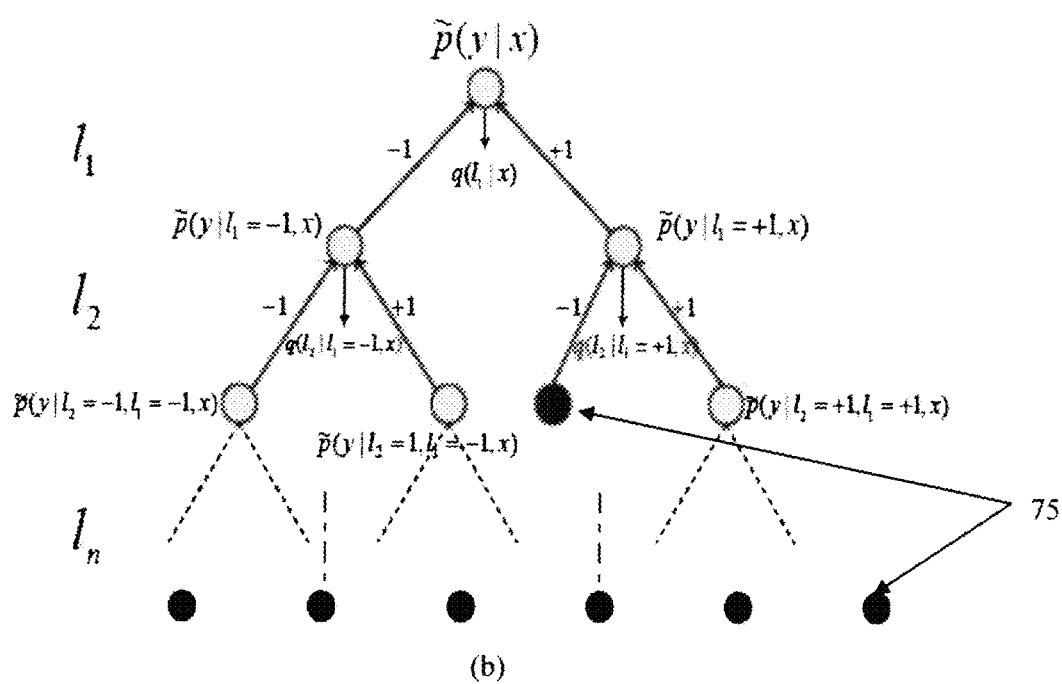
(b)
Figure 7

Figure 8(a) 16 Mega Pixel, wide angle view capturing ~100 people at a train station, (b)(c)(d) showing native resolution views of areas marked by red, blue and green rectangles respectively (Image Courtesy: Avigilon Inc.)

MARGINAL SPACE LEARNING FOR MULTI-PERSON TRACKING OVER MEGA PIXEL IMAGERY

CROSS REFERENCE TO RELATED UNITED STATES APPLICATIONS

This application claims priority from "Total Tracking: Marginal Space Learning For Multi-Person Tracking Over Mega Pixel Imagery", U.S. Provisional Application No. 61/480,520 of Shet, et al., filed Apr. 29, 2011, the contents of which are herein incorporated by reference in their entirety.

TECHNICAL FIELD

This disclosure is directed to methods for tracking pedestrians in video surveillance images.

DISCUSSION OF THE RELATED ART

Multi-person tracking in video surveillance image sequences is a highly challenging task. Traditional computer vision approaches are unable to adequately handle the complexities of motion, occlusions and appearance-change of a large group of intermingling pedestrians observed over standard resolution imagery. FIGS. 1(a) and (b) show two frames from a video with all people detected and consistently labeled (tracked) over time, as indicated by the numbered boxes in the two frames. The scenario depicted in FIG. 1 has a low people count, similar motion patterns between all people, and a relatively small tracking time window. State-of-the-art tracking solutions in existence today [can perform reasonably well on such scenarios.

No system exists today, however, that can perform sustained, total, multi-person tracking in scenes containing a (order of) hundred people, with complex motion/pedestrian interaction patterns, and over long time periods, such as the scenes depicted in FIG. 2. The video frames in FIG. 1 show scenes with dense crowds and complex motion and interaction patterns. Multi-person tracking in general is a challenging task. The challenge arises due to a number of factors, such as frequent inter-person occlusions, similarity in appearance of distinct individuals, complex and unpredictable nature of trajectories, mutual dependence between trajectories, detector initialization failures and low number of pixels on each individual in standard resolution video.

Current state-of-the-art, high density, multi-person tracking methods adopt either a data association based tracking (DAT) approach or a particle filtering based tracking approach. A DAT approach first computes, for each individual pedestrian, a short, high confidence, track fragment, also known as a tracklet. FIG. 3(a) shows an object tracklet schematic over time plotted in the image space. A DAT based multi-person tracking algorithm then associates these tracklets with each other by using them as global constraints. The association of these tracklets is performed by computing affinity measures based on a number of feature descriptors and then assigning each tracklet to another based on the optimization of some global criteria. Since DAT based approaches operate over a global view and perform tracklet association post-hoc using information from both past and future frames, they introduce latency in the overall tracking output.

On the other hand, particle filtering based approaches evolve the system state over time and are thus more amenable for online implementations. FIG. 3(b) schematically shows the evolution of system state over time using particle filters. Particle Filters implement a recursive Bayesian filter, where the probability distribution function (PDF) is represented by a set of random samples with associated weights, which are then used to recursively compute an estimate of the posterior. In such approaches, the tracking task is formulated as the estimation of the system state via computation of the posterior PDF. The system state usually corresponds to the location and velocity estimates of the individuals being tracked. Such approaches, originally designed for single person tracking, do not scale well to multi-person tracking since they try to model the interactions among various individuals explicitly.

Both DAT as well as particle filtering based approaches rely on robustly estimating affinities between pedestrian identity hypotheses or measurements that are needed to evolve the system state over time. There exist a large number of feature descriptors that can, in principle, be used to compute these measurements. However, not all of these feature descriptors provide sufficient information, under all circumstances, to meaningfully resolve the tracking ambiguities. Depending on specific scene conditions, like pedestrian-pedestrian interactions, illumination conditions, resolution at a specific image location, texture, appearance of the tracked pedestrian, etc., different feature descriptors provide different degrees of information for affinity computation. In general, searching for a matching hypothesis over time and over the space of all feature descriptors can be computationally prohibitive.

SUMMARY

Exemplary embodiments of the invention as described herein generally include methods and systems for detecting and consistently labeling every pedestrian in every frame of a video sequence as long as they are within the camera's field of regard. A tracking paradigm according to an embodiment of the invention can exploit the recent emergence of high pixel count video surveillance cameras (~4K×4K pixels). The use of such devices permits the exploitation of a large diversity of feature descriptors, not ordinarily possible using standard definition cameras, to facilitate high accuracy target tracking and re-acquisition. Searching over this increased dimensionality feature space, however, is intractable. To address this, a tracking method according to an embodiment of the invention exploits and reformulates Marginal Space Learning (MSL) to constrain the search space by training and applying hierarchical classifiers in lower dimensions and then sequentially increases the dimensionality of the search space. This strategy reduces, by orders of magnitude, the number of target identity hypotheses that need to be tested. A tracking method according to an embodiment of the invention enables the application of MSL to multi-person tracking and furthermore help reformulate MSL as a particle filtering technique that evolves into progressively higher dimensions.

Spaces such as airports, hotel lobbies, markets or military headquarters constitute areas in which the availability of persistent, tracked surveillance provides a valuable intelligence asset. A tracking system according to an embodiment of the invention can be used both as the basis for a priori prediction of actions based on motion and interaction patterns, and, a posteriori forensic after action analysis. A tracking system according to an embodiment of the invention provides the ability, with a relatively simple installation of video surveillance systems, to support both. By tracking an individual's path under a unique identifier a tracking system according to an embodiment of the invention provides the intelligence for manual or automated analysis of individual and coordinated actions in a large crowded environment.

The automation of such tracking substantially reduces the level of staffing and the training needed for ongoing surveillance. If a tracking system according to an embodiment of the invention is associated with technologies such as facial or gait recognition, then the ability to alert personnel to specific threats becomes substantially enhanced. By replaying tracking information, surveillance analysts can backtrack individuals to ascertain interactions such as hand-offs, placement of packages, hostile operational surveillance or on-site rehearsals or run-throughs. The output from a covert surveillance system according to an embodiment of the invention is a valuable asset in analyzing adversary defensive practices or doctrine for mission planning.

According to an aspect of the invention, there is provided a method for tracking pedestrians in a video sequence, where each image frame of the video sequence corresponds to a time step. The method includes using marginal space learning to sample a prior probability distribution of multi-person identity assignments for a current image frame in the video sequence given a set of feature measurements from all previous image frames in the video sequence, using marginal space learning to estimate an observation likelihood distribution of the set of features for the current image frame given a set of multi-person identity assignments for the current image frame sampled from the prior probability distribution of multi-person identity assignments for the current image frame, calculating a posterior probability distribution of multi-person identity assignments for the current image frame from the observation likelihood distribution for the current image frame and the prior probability distribution for the current image frame, and using marginal space learning to estimate the prior probability distribution of multi-person identity assignments for a next image frame in the video sequence given the posterior probability distribution of multi-person identity assignments for the current image frame and a probability $p(x_{t+1}|x_t)$ of multi-person identity assignments for the next image frame given the multi-person identity assignments of the current image frame, where the posterior probability distribution of multi-person identity assignments corresponds to a set of pedestrian detection hypotheses for the video sequence.

According to a further aspect of the invention, marginal space learning includes generating an initial hypothesis for a first subset of features for localizing a pedestrian in an image frame of the video sequence, providing the initial hypothesis and the image frame to a first classifier trained to detect the first subset of features, where the output of the first classifier is a first probability distribution function for localizing the pedestrian in to the image frame, restricting the first probability distribution function to regions of highest probability for localizing the pedestrian, and providing the restricted first probability distribution function and the image frame to a second classifier trained to detect a second subset of features, where a search space for the second classifier is a Cartesian product of a search space associated with the restricted first probability distribution function and a search space of the second subset of features.

According to a further aspect of the invention, each classifier is a probabilistic boosting tree.

According to a further aspect of the invention, each classifier is part of an ordered sequence of classifiers, where a probability distribution output from a previous classifier in the ordered sequence of classifiers is restricted to a most probable regions before being provided to a subsequent classifier in the ordered sequence of classifiers, and a search space for each subsequent classifier is a Cartesian product of a search space associated with the restricted probability distribution of the previous classifier and a search space of the subset of features associated with the subsequent classifier.

According to a further aspect of the invention, features include appearance features, trajectory features, motion features, and activity features.

According to a further aspect of the invention, the appearance features include a full body color histogram, an upper body color histogram, a lower body color histogram, feature points, patches, textures, a face, 3D Body parts, Haar wavelets, a histogram of ordered gradients, and covariance matrices.

According to a further aspect of the invention, the trajectory features include a tracklet length in frames, a tracklet gap in frames, and tracklet similarity According to a further aspect of the invention, the motion features include motion continuity in image plane, motion continuity in ground plane, and repetitive motion matching.

According to a further aspect of the invention, the activity features include scene closed world interactions, and scene semantic hotspot interactions.

According to a further aspect of the invention, the prior probability distribution of multi-person identity assignments for the current image frame in the video sequence given the set of feature measurements from all previous image frames in the video sequence is a probability of all multi-person identity assignment combinations given the set of feature measurements from all previous image frames.

According to a further aspect of the invention, the method includes determining an optimal multi-person identity assignment in each frame of a subsequence of frames in the video sequence from an identity assignment combination with a maximum posterior probability in each frame, forming a trajectory for a single identified person over consecutive frames in the subsequence of frames from identified persons with a same identity assignment in each frame, analyzing the maximum posterior probability in each frame, where if the maximum posterior probability for a single identified person is lower than a predetermined threshold in a frame, the trajectory for that single identified person is cut from that frame into shorter tracklets, and jointly analyzing all tracklets in the subsequence of frames to link those tracklets into longer trajectories to obtain final tracking results.

According to a further aspect of the invention, jointly analyzing all tracklets in the subsequence of frames to link those tracklets into longer trajectories comprises maximizing linking scores of tracklets in the subsequence of frames to associate each pedestrian tracking hypothesis corresponding to a single trajectory, where the linking score $P_{link}$ for two tracklets $T_i$, $T_j$ is defined as $P_{link}(T_i,T_j)=A_m(T_i,T_j)A_t(T_i,T_j)A_{appr}(T_i,T_j)$, where $A_m$ represents a motion model defined by $A_m(T_i,T_j)=G(x_i^{tail}+v_i^{tail}\Delta t-x_j^{head},\sigma)G(x_j^{head}-v_j^{head}\Delta t-x_i^{tail},\sigma)$, where $\Delta t$ is the time gap between a tail of $T_i$ and a head of $T_j$, G is a zero-mean Gaussian distribution with standard deviation $\sigma$, $x_i$, $x_j$ and $v_i$, $v_j$ are positions and velocities of the head part or tail part of $T_i$ and $T_j$, respectively, $A_t$ represent a time model defined by $$A_t(T_i, T_j) = \begin{cases} 1, & \text{if } \Delta t > 0, \\ 0, & \text{otherwise}, \end{cases}$$

where a link between $T_i$ and $T_j$ is possible if the tail of $T_i$ appears earlier than the head of $T_j$, and $A_{appr}$ represents an appearance model defined by $A_{appr}(T_i,T_j)=\text{Corr}(\text{Color}(x_i^{tail})$, Color($x_j^{head}$)), where Corr is a correlation coefficient of two color histograms Color extracted from the tail of $T_i$ and the head of $T_j$ respectively.

According to another aspect of the invention, there is provided a system for tracking pedestrians in a video sequence, where each image frame of the video sequence corresponds to a time step. The system includes a megapixel camera connected to a backend of a network video recorder, a control center connected to the network video recorder that provides an image control interface to view and access the video sequence, and that parallelizes the video sequence received from the megapixel camera into parallel video streams that correspond to different subregions of a state space viewed by the megapixel camera, and a plurality of local track processing units, each local track processing unit associated with a different subregion of the state space, each local track processing unit executing a computer readable program of instructions tangibly embodied in one or more non-transitory computer readable program storage devices, the computer readable program of instructions adapted to perform method steps for tracking pedestrians in the associated subregion of the state space through the video sequence.

According to a further aspect of the invention, the method for tracking pedestrians in the associated subregion of the state space through the video sequence includes using marginal space learning to sample a prior probability distribution of multi-person identity assignments for a current image frame in the video sequence given a set of feature measurements from image frames for all previous time steps in the video sequence, using marginal space learning to estimate an observation likelihood distribution of the set of features for the current image frame given a set of multi-person identity assignments for the current image frame sampled from the prior probability distribution of multi-person identity assignments, calculating a posterior probability distribution of multi-person identity assignments for the current image frame from the observation likelihood distribution for the current image frame and the prior probability distribution for the current image frame, using marginal space learning to estimate the prior probability distribution of multi-person identity assignments for a next image frame in the video sequence given the posterior probability distribution of multi-person identity assignments for the current image frame and a probability $p(x_{t+1}|x_t)$ of multi-person identity assignments for the next image frame given the multi-person identity assignments of the current image frame, where the posterior probability distribution of multi-person identity assignments corresponds to a set of pedestrian detection hypotheses for the video sequence.

According to another aspect of the invention, there is provided a non-transitory program storage device readable by a computer, tangibly embodying a program of instructions executed by the computer to perform the method steps for tracking pedestrians in a video sequence, where each image frame of the video sequence corresponds to a time step.

BRIEF DESCRIPTION OF THE DRAWINGS

FIGS. 7(a)-(b) show an illustration of a PBT on a synthetic dataset and the probabilistic model captured in the tree respectively, according to an embodiment of the invention.

DETAILED DESCRIPTION OF EXEMPLARY EMBODIMENTS

Figure 1:
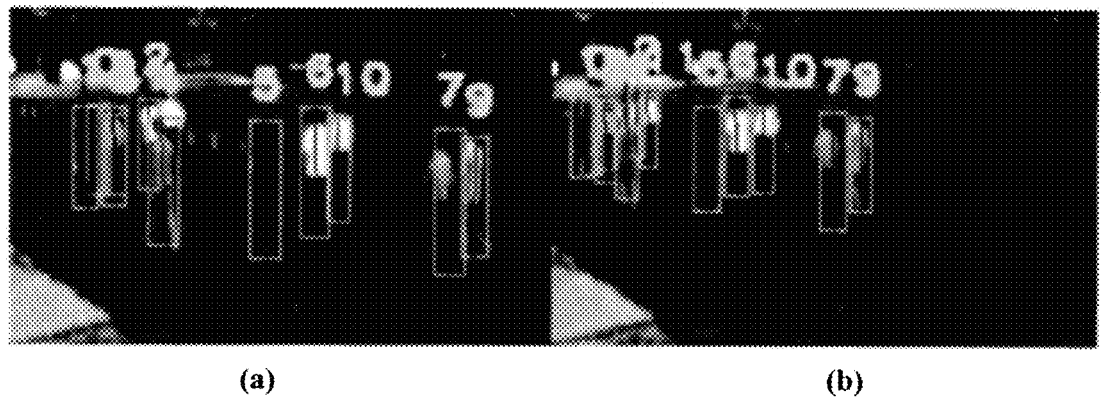
FIGS. 1 (a)-(b) show two frames from a video with all people detected and consistently tracked over time, according to an embodiment of the invention.
Figure 2:
FIG. 2 illustrates issued with multi-person tracking in scenes containing hundreds people, with complex motion/pedestrian interaction patterns, and over long time periods, according to an embodiment of the invention.
Figure 3:
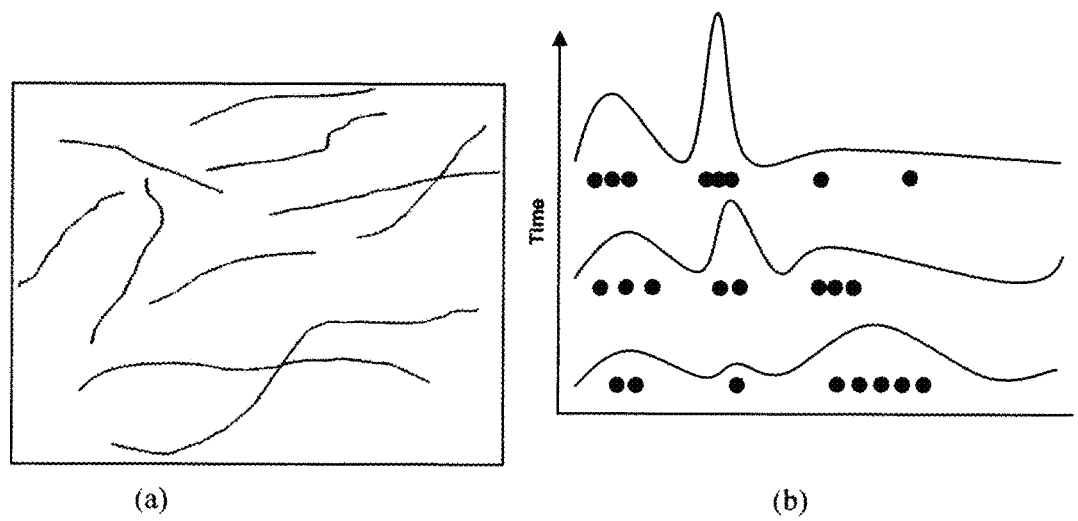
FIG. 3(a) shows an object tracklet schematic over time plotted in the image space, according to an embodiment of the invention.
FIG. 3(b) schematically shows the evolution of system state over time using particle filters, according to an embodiment of the invention.

Exemplary embodiments of the invention as described herein generally include systems and methods for detecting and consistently labeling every pedestrian within the camera's field of regard of every frame of a video sequence. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-dimensional images and voxels for 3-dimensional images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2- dimensional picture or a 3- dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

According to an embodiment of the invention, multi-person tracking can be formulated as an estimation of the system state via computation of the posterior probability distribution function (PDF). Particle Filters are used to compute an estimate of the posterior over the system state. To address the issue of scaling particle filters to multi-person tracking, pedestrian identity information is implicitly encoded by choosing a state space that corresponds to the space of all possible identity assignments of people over time. A tracking system according to an embodiment of the invention can maintain a probability distribution over the space of all identity assignments, as opposed to committing to one assignment, thus permitting belief revision (identity re-assignment) over time if new, unseen information becomes available.

While Particle Filters by themselves provide an elegant estimation of the posterior, however, sampling over large dimensional state spaces is computationally prohibitive. To address this, a tracking system according to an embodiment of the invention exploits the fact that high dimensional tracking applications are characterized by state changes that occur in a low dimensional effective basis.

According to an embodiment of the invention, Marginal Space Learning can be reformulated to perform efficient sampling over the system state space. Marginal Space Learning learns and imposes an ordering over the application of classifiers on the feature descriptors for efficient sampling, where the dimensionality of the sampling space is increased sequentially. A learning method according to an embodiment of the invention can use discriminative classifiers trained from annotated data to directly estimate a component of the posterior in a sequence of low dimensional marginal feature spaces. This enables directly and efficiently estimating modes of this distribution thereby significantly reducing the number of samples (particles) needed. While an approach according to an embodiment of the invention can reduce the dimensionality of the sampling space, an approach according to an embodiment of the invention can formally treat Marginal Space Learning as a technique that facilitates evolution of particle filtering into progressively higher dimensions.

All these computations are performed over imagery acquired using a high resolution (e.g. 16 mega pixels or more) video camera to ensure that sufficient numbers of pixels are obtained for each individual to be tracked. The use of high resolution video cameras permits the use of feature descriptors that would not ordinarily be feasible for long range video surveillance, such as face based and texture based descriptors. The potential use of such a large number of features and the ensuing high dimensional feature search space motivates the proposed marginal space learning based sampling strategy.

A tracking method according to an embodiment of the invention ingests a single stream of high resolution video from a stationary camera. The video camera acts as a persistent sensor in a constrained area visited by several hundred people. A sampling according to an embodiment of the invention is implemented using a large number and diversity of feature descriptors for sequentially searching for pedestrian hypotheses and matching these hypotheses over time to perform sustained tracking. Specifically, these hypotheses correspond to pedestrian detection hypotheses and pedestrian tracklet hypotheses. For every target at each time instant, a contact record with a unique ID is created for the individual along with a time, image ID(s) and locations in each video stream. A tracking system according to an embodiment of the invention constructs a track over time from an individual's contacts and tracklets, properly accounting for obscured/occluded/out-of-field periods, misidentifications, or, resolving other errors (e.g., contact "jumps" too fast for allowable motion).

Bayesian Multi-Person Tracking Formulation

Multi-person tracking according to an embodiment of the invention is formulated as an estimation of the system state via computation of the posterior PDF. Let $x_t$ denote a random variable capturing system state at time t. For multi-person tracking, this variable encodes all possible states of identity assignments of all pedestrian hypotheses at t. For crowded scenes with large numbers of people, the dimensionality of this state variable is very large. Let $z_t$ denote feature measurements at time t and $Z^t = \{z_1, \ldots, z_t\}$ denote measurements up to the time t, then the posterior PDF to be estimated is:

$$p(x_t | Z^t) = \frac{p(z_t | x_t) p(x_t | Z^{t-1})}{p(z_t)} \quad (1)$$

$$= \frac{p(z_t | x_t) \int_{x_{t-1}} p(x_t | x_{t-1}) p(x_{t-1} | Z^{t-1}) dx_{t-1}}{p(z_t)} \quad (2)$$

Solving EQ. (1) is challenging, since the computation of $p(x_t | Z^{t-1})$ would require integrating over the entire system state $x_{t-1}$ as shown in EQ. (2). Particle filters provide one means of approximating this distribution by performing sequential Monte Carlo estimations on a point mass representation of the probability distributions. Particle filters implement a recursive Bayesian filter where the PDF is represented by a set of random samples with associated weights, which are used to compute an estimate of the posterior.

Figure 4:
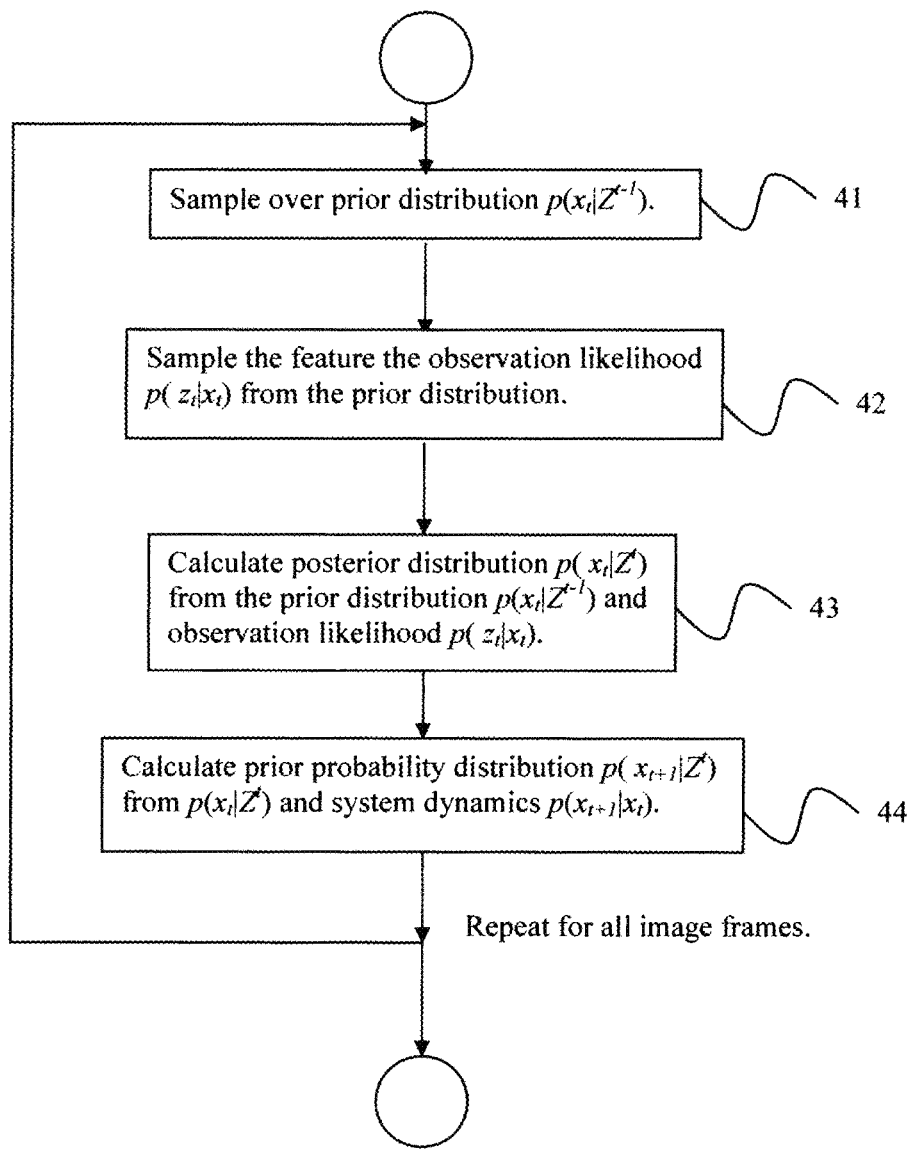
FIG. 4 is a flow chart of a a particle filtering method according to an embodiment of the invention.

A flow chart of a particle filtering method according to an embodiment of the invention is shown in FIG. 4. A particle filtering method according to an embodiment of the invention begins at step 41 by sampling over $p(x_t | Z^{t-1})$, the prior probability distribution of multi-person identity assignments for a current image frame in the video sequence given the set of feature measurements from all previous image frames. At step 42, $p(z_t | x_t)$, the observation likelihood distribution of the set of features for the current image frame given a set of multi-person identity assignments for the current image frame, are sampled from the prior probability distribution. The prior probability $p(x_t | Z^{t-1})$ and observation likelihood $p(z_t | x_t)$ are used to calculate $p(x_t | Z^t)$ the posterior probability distribution of multi-person identity assignments for the current image frame, using EQ. (1), at step 43, and, at step 44, $p(x_{t+1} | Z^t)$, the prior probability distribution of multi-person identity assignments for a next image frame are calculated from $p(x_t | Z^t)$ and a probability $p(x_{t+1} | x_t)$ of multi-person identity assignments based on system dynamics. Steps 41-44 are then repeated for each image frame. Note that $p(z_t)$ represents the prior over the observations at time t and would be a constant normalization factor for a given time t. Thus, the left hand side of EQ. (1) can be estimated to be proportional to the numerator of the right hand side of EQ. (1).

The posterior probability distribution of multi-person identity assignments is a probability of all multi-person identity assignment combinations given the set of feature measurements from all previous image frames, and corresponds to a set of pedestrian detection hypotheses for the video sequence. To obtain the trajectories in a given time window of a plurality of image frames, the optimal ID assignment with maximum probability is found for each frame. However, due to missed detections caused by occlusion between tracked targets, the estimation of $p(x_t | Z^t)$ may not be accurate over the time, as will be described below.

While these steps provide an elegant solution to the estimation of the posterior, sampling over large dimensional state spaces is computationally prohibitive. However, high dimensional tracking applications are characterized by state changes that occur in a low dimensional effective basis. A tracking method according to an embodiment of the invention uses a time varying effective basis to reduce dimensionality and Marginal Space Learning for sampling the distributions in steps 41, 42, and 44 of FIG. 4, to maintain a limited number of samples to represent the underlying probability distribution.

Marginal Space Learning (MSL)

MSL uses the fact that the posterior distribution of the correct parameters given the data lies in a small region of the complete n-dimensional parameter space: $R_n \subset \Omega_n$. Let $P(\Omega_n|D)$ be the true posterior given the data D. Instead of exhaustively searching for $R_n$ directly in $\Omega_n$, MSL proposes to start the search in one of its low dimensional marginal spaces $\Omega_1$ and sequentially increase the dimensionality of the search space:

$$\Omega_1 \subset \Omega_2 \subset \ldots \subset \Omega_n, \quad (3)$$

such that $\dim(\Omega_k) - \dim(\Omega_{k-1})$ is usually small. Assume that the probability distribution over space $\Omega_k$ has been learned, resulting in a subspace $\Pi_k$ with the most probable values. This allows restricting the learning and evaluation of the next higher dimensional marginal space to $\Pi_k \times \Omega_{k+1}$, the Cartesian product of the subspace of most probable values and the space of the next feature vector. Hence, by restricting the final $R_n$ early during the learning process, orders of magnitude fewer parameters need be examined. This differs from a normal cascade of strong classifiers, in which the searching and learning are performed in the same space while the learning and search space for MSL is gradually increased.

Figure 5:
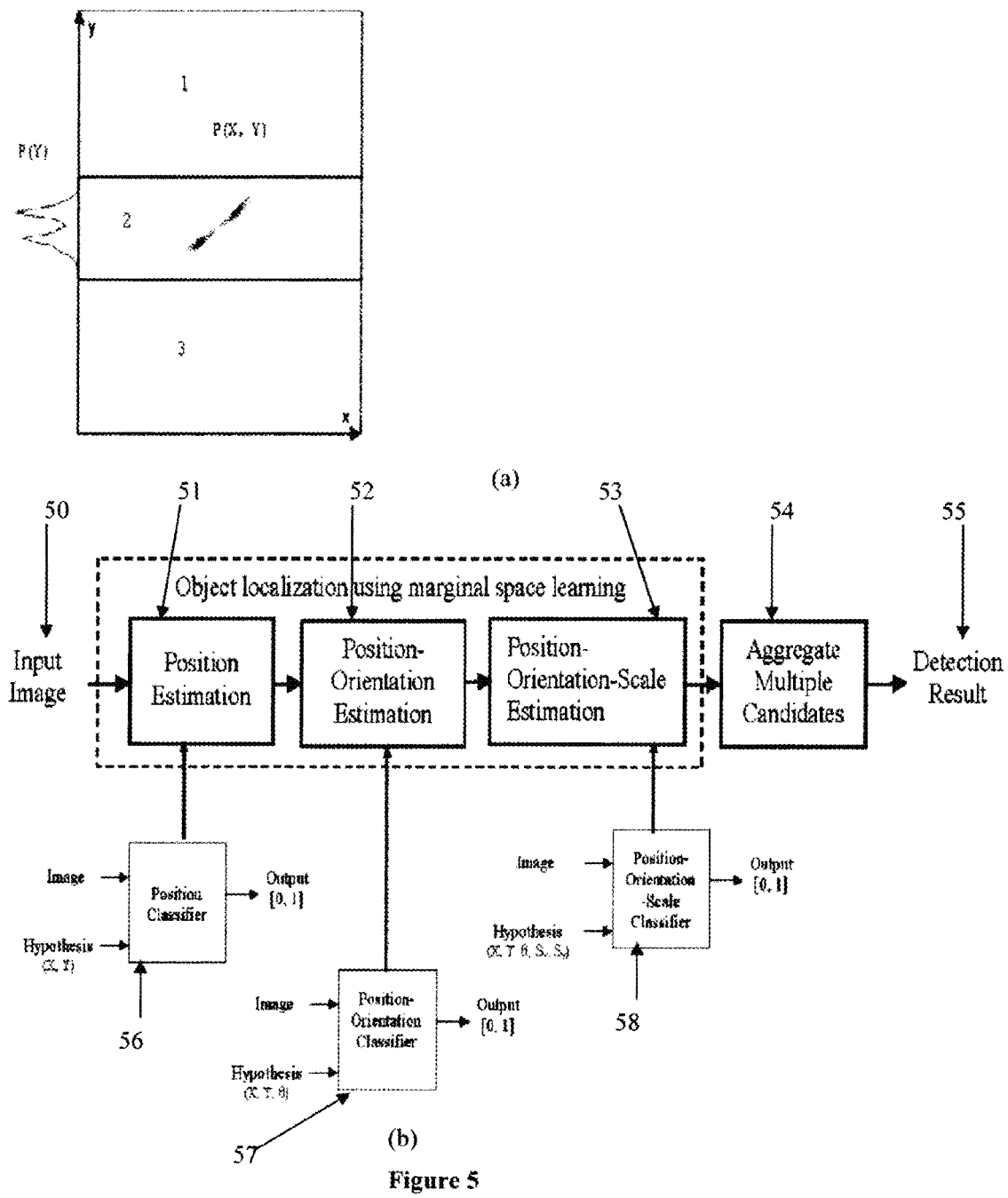
FIG. 5(a) illustrates a simple example for 2D space searching, according to an embodiment of the invention.
FIG. 5(b) illustrates a pipeline for object localization using marginal space learning, according to an embodiment of the invention.

FIG. 5(a) illustrates a simple example for 2D space searching. A classifier trained on p(y) can quickly eliminate a large portion (regions 1 and 3) of the search space. Another classifier can be trained in a much smaller region (region 2 in FIG. 5(a)) for the joint distribution p(x,y). MSL is similar to particle filters in the way it handles multiple hypotheses. Both approaches maintain a limited number of samples to represent the underlying probability distributions. Samples are propagated sequentially to the following stages and pruned by the model.

FIG. 5(b) illustrates an exemplary, non-limiting pipeline for 2D object localization using marginal space learning (MSL). For 2D object detection, only five object pose parameters, $(X, Y, \theta, S_x, S_y)$, with $(X, Y)$ for the object position, $\theta$ for orientation, and $(S_x, S_y)$ for anisotropic scaling, need to be estimated. Instead of exhaustively searching the full parameter space directly, MSL splits the task into three steps: object position estimation, position-orientation estimation, and position-orientation-scale estimation. For each step, a classifier is trained to assign a high score to a correct hypothesis. After each step, only a limited number of hypotheses are obtained for the following processing. Referring now to the figure, object localization begins at step 51 by estimating an object position. An input image 50 is provided to a trained position classifier 56, along with an initial position hypothesis for the object in the image. Note that the initial hypothesis can be generated by any object detector. All pixels are tested using the trained position classifier 56, which outputs a probability distribution function (pdf) of the most likely object positions, and the top $N_1$ candidates, $(X_i, Y_i)$, $i=1, \ldots, N_1$, are selected. An exemplary, non-limiting value for $N_1$ is 1000. Next, the whole orientation space is discretized with a resolution of, e.g., five degrees, resulting in 72 orientation hypotheses. Each selected position candidate is augmented with all orientation hypotheses, $(X_i, Y_i, \theta_j)$, $j=1, \ldots, 72$, for a total of 1000× 72=72,000 hypotheses. Then, at position-orientation estimation step 52, the input image, and the 72,000 orientation-position hypotheses are provided to a position-orientation classifier 57. The output of the trained position-orientation classifier 57 is a position-orientation pdf, which is used to prune the 72,000 hypotheses to retain the top $N_2$ candidates, $(\hat{X}_i, \hat{Y}_i, \hat{\theta}_i)$, $i=1, \ldots, N_2$. An exemplary, non-limiting value for $N_2$ is 100. Similarly, each position-orientation candidate is augmented with a set of hypotheses about scaling. For example, for 200 scale combinations, there would be of 100× 200=20,000 hypotheses. At position-orientation-scale estimation step 53, a trained position-orientation-scale classifier 58 is then used to pick the best hypothesis. The output of the position-orientation-scale classifier is a position-orientation-scale pdf containing multiple candidates 54, from which a best hypothesis is selected as the object detection result 55.

At each stage of the three stage classifier shown in FIG. 5(b), MSL is used to prune the output of the previous stage before providing the pruned output to the next stage. As shown in FIG. 5(b), using this approach, three classifiers can be trained for object localization instead of a single monolithic classifier. Learning and detection is performed in marginal spaces of increasing dimensions. For a typical image of 300×200 pixels, there are 300×200+1000×72+100×200=152,000 hypotheses to be tested. By comparison, a monolithic full space classifier for all 5 parameters would need to test 300×200×72×200=8.64× $10^8$ hypotheses. This can be reduced by about 2 orders of magnitude by a coarse-to-fine strategy, but the resulting number of hypotheses is still an order of magnitude greater than that obtained by MSL. Since the speed of the system is roughly proportional to the number of hypotheses, MSL is about an order of magnitude faster than full space learning.

Note that the object localization classifiers shown in FIG. 5(b) are exemplary and non-limiting, and an object detection and tracking method according to other embodiments of the invention uses many other feature attributes for object detection and tracking, thus the feature space will contain many more dimensions, and there will be more stages to the classifier.

For tracking, as an example, assume there are three pedestrians in the scene each appearing in three different regions in the image. Assume that two of these pedestrians cross paths from the cameras point of view, while the third pedestrian moves across the scene without any visual interaction with the other two individuals. In such a case, the state space of identity assignments would be 3!=6 in number. Therefore there are 6 possible identity assignments possible for the three pedestrians in this example scene. However, in reality, since 1 person never interacts with the other two individuals and only the other two individuals interact with each other there are only two states that are possible in the world: one where pedestrian 1's identity remains the same and the identities of the other two pedestrians are either switched or not. This is an example of how the system state in actuality evolves along a lower dimensional manifold, although its inherent dimensionality is high.

In this example, using the ideas of Marginal Space Learning, classifiers can be built to, for example, look at pairwise motion trajectories that can help "measure" how pedestrian 1 is moving away from the other two pedestrians. Thus, there is likely to be no mode at states where the identity of the first pedestrian is switched. In the next iteration, a pairwise motion based classifier is applied in conjunction with a pairwise appearance based classifier that "measures" that it is likely that one switch between pedestrians 2 and 3 is more likely than the other. If, in this example, there were many more interacting pedestrians, as there would be in a wide angle view seen over a high resolution camera, sequential application of more and more specific classifiers would help prune the search space from a brute force search over N factorial states to a significantly smaller number.

Thus, for tracking, one expects to obtain distributions over states of identities (tracks) of all the people in a scene. However, methods according to embodiments of the invention do not require a hard selection to go to the next point in time in the video. The whole distribution itself can be carried over as is and it will be further refined/evolved by MSL. However, to display the results for human consumption, a selection can be made by picking a highest probability state, and a corresponding object ID can be displayed.

Figure 6:
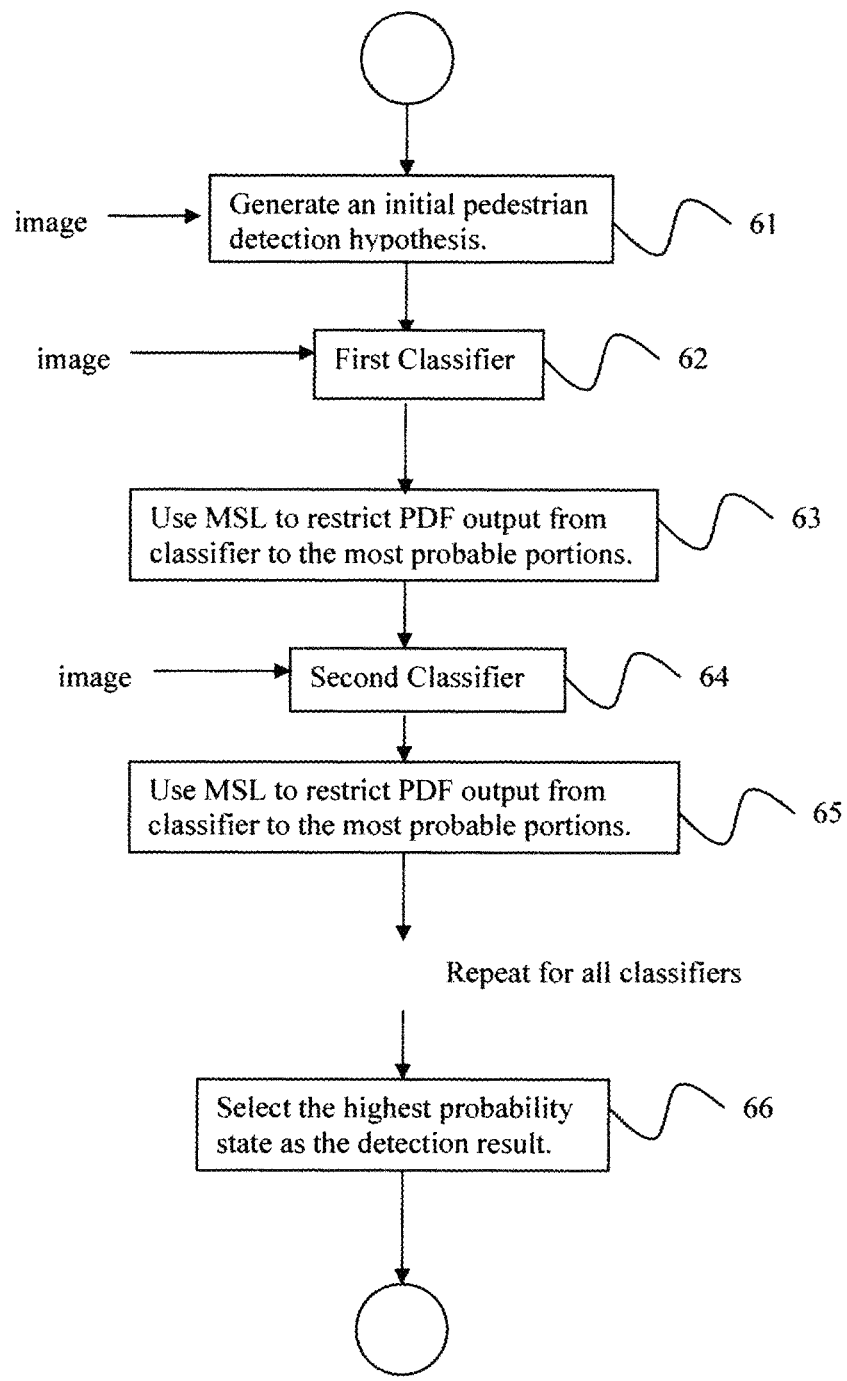
FIG. 6 is a flow chart of a method of sampling a probability distribution using MSL, according to an embodiment of the invention.

FIG. 6 is a flow chart of a method of sampling a probability distribution using MSL, according to an embodiment of the invention. Referring now to the figure, given an image frame from a video sequence, a search process according to an embodiment of the invention for detecting an object is bootstrapped at step 61 by generating an initial pedestrian detection hypothesis. This pedestrian detection hypothesis can be generated by any object detector as are known in the art. The pedestrian detection hypothesis and the image are provided to a classifier at step 62. As will be described below, each classifier is a probabilistic boosting tree (PBT) trained to detect specific features whose output is a probability distribution function (PDF) for the detected features. At step 63, marginal space learning (MSL), described below, is used to restrict the PDF output by the classifier at step 62 to the most probable portions. This restricted PDF is then provided, at step 64, along with the image frame, to a next classifier trained for a different set of features. Similarly, at step 65, the output PDF of the next classifier will be restricted by MSL to the most probable portions. Each classifier in a sense observes the world through a specifically tuned filter. Ideally all classifiers would be applied and a decision would be made as to which person went where in a next frame. However, this is intractable due to the large number of attributes for these classifiers. Hence the sequence of the application of these classifiers is important, which can vary depending on the type of detection task. This iterative approach of using a cascade of classifiers, each trained to detect a different set of features, and restricting the output of each classifier using MSL before providing the restricted output to the next classifier, reduces the computational demands to enable tracking individuals in megapixel video sequences. This iterative approach is repeated for all classifiers in the cascade, after which, at step 66, the highest probability state is selected as the detection result. A method such as that depicts in FIG. 6 can be used to sample the prior probability distribution $p(x_t|Z^{t-1})$ and the observation likelihood $p(z_t|x_t)$ of EQ. (1).

Probabilistic Boosting Tree

Embodiments of the invention use the Probabilistic Boosting Tree (PBT) as a classifier to represent the posterior in each marginal subspace. In the learning stage, the probabilistic boosting-tree automatically constructs a tree in which each node combines a number of weak classifiers (evidence, knowledge) into a strong classifier (a conditional posterior probability). A PBT according to an embodiment of the invention approaches the target posterior distribution by data augmentation (tree expansion) through a divide-and-conquer strategy. In a testing stage, the conditional probability is computed at each tree node based on the learned classifier, which guides the probability propagation in its sub-trees. The top node of the tree therefore outputs the overall posterior probability by integrating the probabilities gathered from its sub-trees. Also, clustering is naturally embedded in the learning phase and each sub-tree represents a cluster of certain level.

Specifically, a PBT is similar to a decision tree but instead of using just one attribute at each node, a strong AdaBoost classifier is trained to find the probability of classes $y=\{+1, -1\}$ using several weighted weak classifiers h(t): $H(x)=\Sigma_{t=1}^{T} \alpha_t h_t(x)$. Based on H(x) and the resulting probabilities q(+1|x), q(−1|x), each node recursively subdivides samples into left ($S_{left}$) and right ($S_{right}$). It then trains another strong classifier in both sets unless the empirical distribution $q(y)=\Sigma i\omega_i \delta_i (y_i=y)$ directly defines the class or a maximum depth is reached. During testing, the complete posterior $\tilde{p}(y|x)$ is recursively calculated from the entire tree by adding the probabilities $\tilde{p}(left|right)((y|x)$ of its subtrees, weighted by current classifier's posterior.

FIGS. 7(a)-(b) show an illustration of a PBT on a synthetic dataset and the probabilistic model captured in the tree respectively. Specifically, FIG. 7(a) illustrates a PBT on a synthetic dataset of 2,000 points. The weak classifiers are likelihood classifiers on features such as position and distance to 2D lines. The first level of the tree divides the whole set into two parts, in which nodes 71 are separated from nodes 72, 73, and 74. The tree expands on the parts where positive and negative samples are tangled. The second level of the tree separates out nodes 73 from nodes 72 and 74, while the third level separates nodes 72 from nodes 74. The separated sets are the dark grey nodes 71 and 72, and the light grey nodes 73 and 74. FIG. 6(b) illustrates a probabilistic model of a tree. The nodes 75 are the leaf nodes. Each level of the tree corresponds to an augmented variable. Each tree node is a strong classifier.

Tracking Features

According to an embodiment of the invention, there exist several feature descriptors that can be used as the basis over which the classifiers can be trained. Feature descriptors useful for pedestrian re-identification across multiple cameras include those based on appearance, context, closed world, and association analysis. The table below identifies a number of affinity computation features for in-camera tracking according to embodiments of the invention.

| Category | Feature Descriptors | Category | Feature Descriptors |
|---|---|---|---|
| Appearance | 1. Full body color histogram | Appearance | 9. Haar Wavelets |
| | 2. Upperbody color histogram | | 10. Histogram of Ordered Gradients |
| | 3. Lowerbody color histogram | | 11. Covariance matrices |
| | 4. Feature point | Motion | 12. Motion continuity in image plane |
| | 5. Patch (subregion of a person) | | 13. Motion continuity in ground plane |
| | 6. Texture (visual pattern) | | |

-continued

| Category | Feature Descriptors | Category | Feature Descriptors |
|---|---|---|---|
| | 7. Face | | 14. Repetitive motion matching |
| | 8. 3D Body parts | | |
| Trajectory | 15. Tracklet length in frames | Activity | 18. Scene closed world interactions |
| | 16. Tracklet gap in frames | | 19. Scene semantic hotspot interaction |
| | 17. Tracklet similarity | | |

Referring to the feature table, "Motion continuity in image plane" refers to how smooth a target trajectory would be in 2D image coordinates if two tracklets were connected, "Motion continuity in ground plane" refers to how smooth the target trajectory would be in 3D world coordinates if two tracklets were connected, "Repetitive motion matching" refers to gait information, i.e., a person's walking style, "Scene closed world interactions" refers to situations where a target enters a closed world (e.g. a room with only one door), does not leave the scene, and should appear later, and "Scene semantic hotspot interaction" refers to situations in which a person is dedicated to a certain area, such as an office desk or a car, which provide some clues for identifying that target.

Note that not all of these feature descriptors provide sufficient information, under all circumstances, to serve as meaningful measurements to evolve the system state. Depending on a specific pedestrian-pedestrian interaction scenario, illumination conditions, resolution at a specific image location, texture and appearance of the tracked pedestrian, different feature descriptors, under differing conditions, provide different degrees of information for affinity computation. A Marginal Space Learning based approach according to an embodiment of the invention can be trained to optimally select the order in which classifiers over these feature descriptors are applied. However, this order depends on the specific features being used, and would have to be tuned for specific scenarios.

Tracklet Association

According to an embodiment of the invention, tracklet association based tracking can be augmented to handle partial or total occlusion between targets. Over time it is possible that, as new information becomes available, the probability density function evolves over time such that while one state of tracked identities had the highest likelihood, at a later time instant a different state of tracked identities comes to have the highest likelihood. Thus if the peaks of this distribution are taken to represent the identity assignment of the objects being tracked, then it is possible that the identity assignment might exhibit behavior where they rapidly switch from one assignment to another as the underlying PDF is refined. One way to address this is by performing post-processing over the peaks of this PDF using a tracklet association method as described below.

According to an embodiment of the invention, a three-stage tracking framework can be used to form tracklets and associate tracklets with gaps: grow, cut, and link. Given a time window, an optimal ID assignment for all persons in each frame can be found by taking the state with maximum posterior probability in each frame. In a grow stage according to an embodiment of the invention, detection responses over time with the same ID form one trajectory or tracklet. In a "cut" stage according to an embodiment of the invention, the maximum posterior probability in each frame is analyzed to check tracking uncertainty. If this probability is lower than a predetermined threshold, the trajectory is cut so that the segments of it become shorter but more reliable tracklets. In a "link" stage according to an embodiment of the invention, all tracklets generated in the time window are jointly considered and linked into longer trajectories to obtain the final tracking results.

Assuming that there are n tracklets in each given time window, embodiments of the invention find an optimal association by jointly maximizing the linking scores between those tracklets. Tracklet association can be formulated as a standard assignment task by defining a matrix P of size n×n, and solving it using methods as are known in the art. An exemplary, non-limiting method for determining optimal assignments is the Hungarian algorithm. According to an embodiment of the invention, each element in this matrix is a linking score between two tracklets $T_i$ and $T_j$ that is defined by three cues: motion, time, and appearance:

$$P_{link}(T_i, T_j) = A_m(T_i, T_j) A_t(T_i, T_j) A_{appr}(T_i, T_j). \quad (4)$$

The motion model $A_m$ is defined by $$A_m(T_i, T_j) = G(x_i^{tail} + v_i^{tail}\Delta t - x_j^{head}, \sigma) G(x_j^{head} - v_j^{head}\Delta t - x_i^{tail}, \sigma) \quad (5)$$

where $\Delta t$ is the time gap between the tail of $T_i$ and the head of $T_j$, G is a zero-mean Gaussian distribution with standard deviation $\sigma$, $x_i$ and $v_i$ are positions and velocities of the head part or tail part of $T_i$.

The time model $A_t$ is simply a step function:

$$A_t(T_i, T_j) = \begin{cases} 1, & \text{if } \Delta t > 0, \\ 0, & \text{otherwise,} \end{cases} \quad (6)$$

which makes the link between $T_i$ and $T_j$ possible if the tail of $T_i$ appears earlier than the head of $T_j$.

The appearance model $A_{appr}$ is defined as the correlation coefficient of two color histograms extracted from the tail of $T_i$ and the head of $T_j$ respectively:

$$A_{appr}(T_i, T_j) = \text{Corr}(\text{Color}(x_i^{tail}), \text{Color}(x_j^{head})). \quad (7)$$

Mega Pixel Sensor

Figure 8:
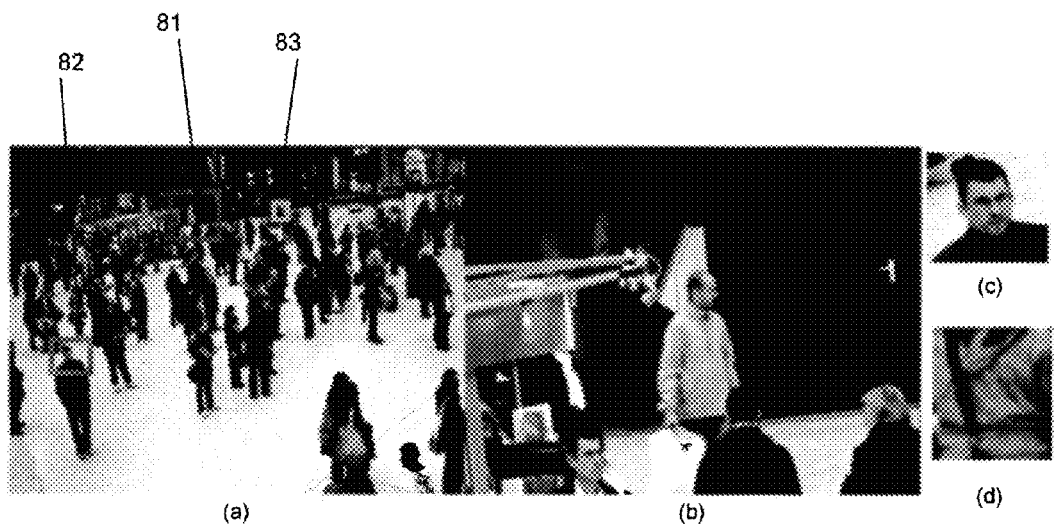
FIGS. 8(a)-(d) depicts a wide angle view with hundreds of people, and individual frames selected from the wide angle view, according to an embodiment of the invention.

A high definition, 4864×3248 pixel, video camera is used to implement an approach according to an embodiment of the invention. Such a camera can observe wide angle views with hundreds of people, such as that depicted in FIG. 8(a), while at the same time obtaining a sufficient number of pixels to resolve narrow-angle sub views, such as the sub-view 81 shown in FIG. 8(b), and individuals 82, 83, such as those shown in FIGS. 8(c) and 8(d). Exemplary, non-limiting off-the-shelf megapixel cameras and video access APIs are available from Avigilon Inc. The use of mega pixel cameras permits the use of feature descriptors that would not ordinarily be feasible for long range video surveillance, such as face based and texture based descriptors, as shown in FIGS. 8(c) and 8(d). The potential use of such a large number of features and the ensuing high dimensional feature search space motivates a proposed marginal space learning based sampling strategy.

System Description and Architecture

Figure 9:
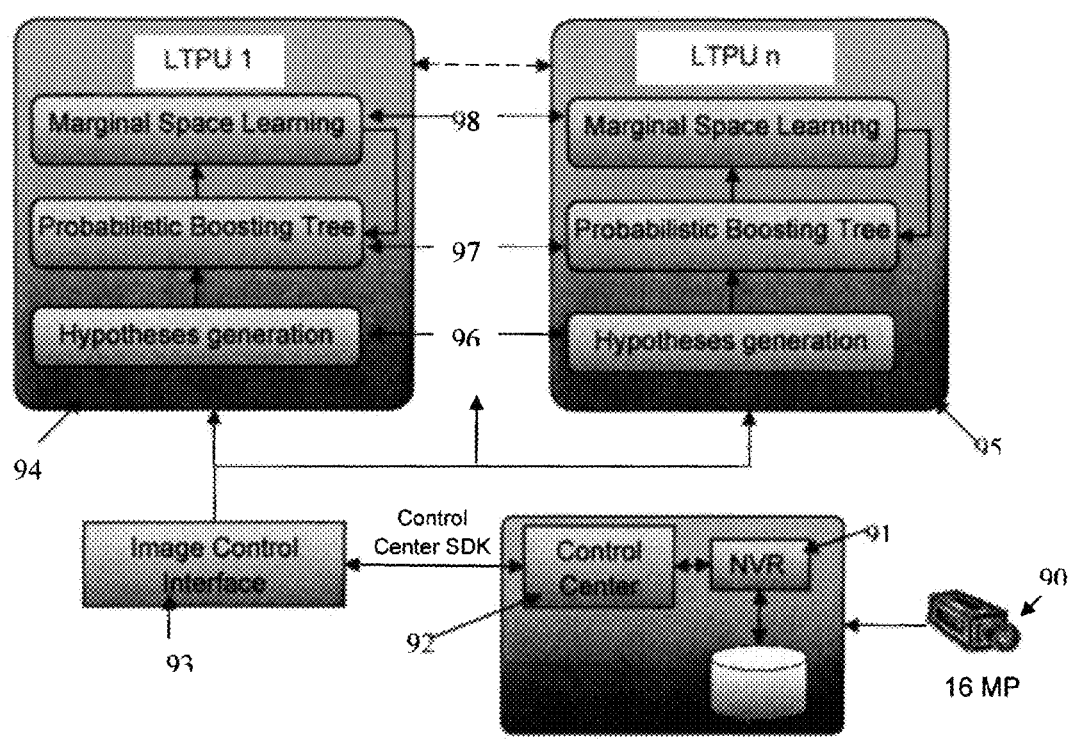
FIG. 9 shows an exemplary, non-limiting parallel system architecture that implements a tracking method according to an embodiment of the invention.

A tracking system according to an embodiment of the invention can be scaled up over a parallel architecture to cope with constraints arising from run-time requirements. In an architecture according to an embodiment of the invention, different processing units process different parts of the state space. Tracking data from different regions of the state space is assembled at the level of the whole state space to obtain the full PDF. FIG. 9 shows an exemplary, non-limiting parallel system architecture that implements a tracking method according to an embodiment of the invention. A 16 megapixel camera 90 is connected at the backend to a Network Video Recorder (NVR) 91. While the NVR 91 manages the storage and retrieval of the high resolution video to disk, Control Center software 92 provides an image control interface 93 to view and access the video. An exemplary, non-limiting NVR 91 and Control Center software 92 can be purchased along with an exemplary 16 MP camera from Avigilon Inc. Avigilon also provides access to the high definition camera image data via a server level software development kit (SDK) that communicates with the Control Center software.

Embodiments of the invention provide an image control interface 93 that communicates with the Control Center Software 92 via this SDK and serves to parallelize the processing of different regions of the state space. The parallelized streams are then routed to individual local track processing units (LTPU). For clarity, the figures shows two LTPUs, LTPU1 94 and LTPU2 95, however, embodiments of the invention are not limited to the LTPUs shown, and can have more such LTPUs. Each LTPU implements a hypotheses generator 96, a probabilistic boosting tree 97 and the marginal space learning based tracking components 98. These components close the processing loop via top down feedback within the local unit as well as via exchange of information across other parallel LTPUs. These LTPUs run on a high count multi-core hardware system. Embodiments of the invention use at least one or more processing cores per LTPU resulting in a fully parallelized architecture.

System Implementations

It is to be understood that the present invention can be implemented in various forms of hardware, software, firmware, special purpose processes, or a combination thereof. In one embodiment, the present invention can be implemented in software as an application program tangibly embodied on a computer readable program storage device. The application program can be uploaded to, and executed by, a machine comprising any suitable architecture.

Figure 10:
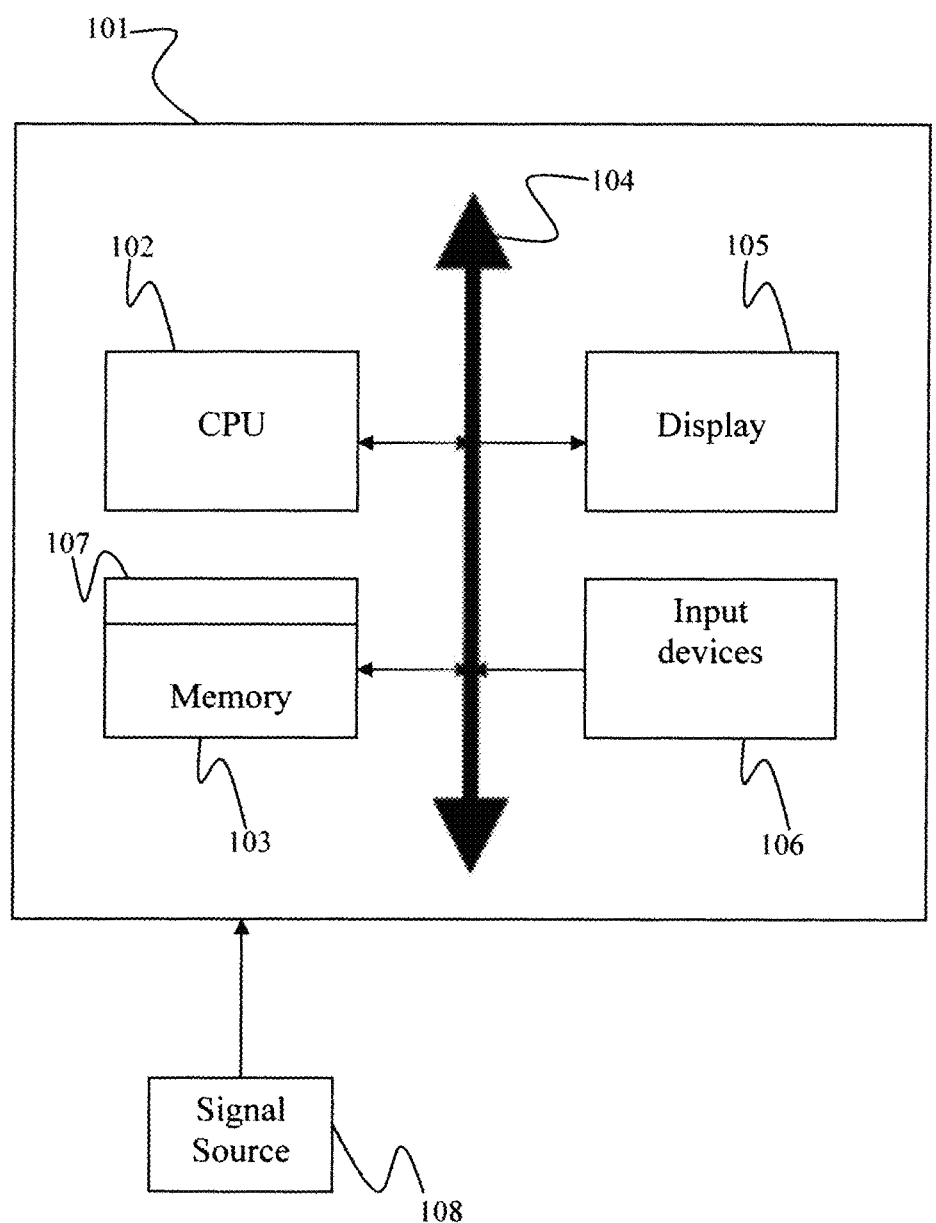
FIG. 10 is a block diagram of an exemplary individual computer system for implementing a tracking method according to an embodiment of the invention.

FIG. 10 is a block diagram of an exemplary computer system for implementing a method for detecting and consistently labeling every pedestrian within the camera's field of regard of every frame of a video sequence, according to an embodiment of the invention. Referring now to FIG. 10, a computer system 101 for implementing the present invention can comprise, inter alia, one or more central processing units (CPU) 102, a memory 103 and an input/output (I/O) interface 104. The computer system 101 is generally coupled through the I/O interface 104 to a display 105 and various input devices 106 such as a mouse and a keyboard. The support circuits can include circuits such as cache, power supplies, clock circuits, and a communication bus. The memory 103 can include random access memory (RAM), read only memory (ROM), disk drive, tape drive, etc., or a combinations thereof. The present invention can be implemented as a routine 107 that is stored in memory 103 and executed by the CPU 92 to process the signal from the signal source 108. As such, the computer system 101 is a general purpose computer system that becomes a specific purpose computer system when executing the routine 107 of the present invention.

The computer system 101 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for tracking pedestrians in a video sequence, wherein each image frame of the video sequence corresponds to a time step, comprising:

using marginal space learning to sample a prior probability distribution of multi-person identity assignments for a current image frame in the video sequence given a set of feature measurements from all previous image frames in the video sequence;

using marginal space learning to estimate an observation likelihood distribution of the set of features for the current image frame given a set of multi-person identity assignments for the current image frame sampled from the prior probability distribution of multi-person identity assignments for the current image frame;

calculating a posterior probability distribution of multi-person identity assignments for the current image frame from the observation likelihood distribution for the current image frame and the prior probability distribution for the current image frame; and using marginal space learning to estimate the prior probability distribution of multi-person identity assignments for a next image frame in the video sequence given the posterior probability distribution of multi-person identity assignments for the current image frame and a probability $p(x_{t+1}|x_t)$ of multi-person identity assignments for the next image frame given the multi-person identity assignments of the current image frame, wherein said posterior probability distribution of multi-person identity assignments corresponds to a set of pedestrian detection hypotheses for the video sequence, wherein the steps of using marginal space learning to sample a prior probability distribution of multi-person identity assignments for a current image frame, using marginal space learning to estimate an observation likelihood distribution, calculating a posterior probability distribution, and using marginal space learning to estimate the prior probability distribution of multi-person identity assignments for a next image frame are performed by a computer processor.

2. The method of claim 1, wherein marginal space learning comprises:
   generating an initial hypothesis for a first subset of features for localizing a pedestrian in an image frame of the video sequence;
   providing said initial hypothesis and said image frame to a first classifier trained to detect the first subset of features, wherein the output of the first classifier is a first probability distribution function for localizing said pedestrian in said image frame;
   restricting the first probability distribution function to regions of highest probability for localizing said pedestrian; and
   providing said restricted first probability distribution function and said image frame to a second classifier trained to detect a second subset of features, wherein a search space for the second classifier is a Cartesian product of a search space associated with the restricted first probability distribution function and a search space of the second subset of features.

3. The method of claim 2, wherein each classifier is a probabilistic boosting tree.

4. The method of claim 2, wherein each classifier is part of an ordered sequence of classifiers, wherein a probability distribution output from a previous classifier in the ordered sequence of classifiers is restricted to a most probable regions before being provided to a subsequent classifier in the ordered sequence of classifiers, and a search space for each subsequent classifier is a Cartesian product of a search space associated with the restricted probability distribution of the previous classifier and a search space of the subset of features associated with the subsequent classifier.

5. The method of claim 1, wherein features include appearance features, trajectory features, motion features, and activity features.

6. The method of claim 5, wherein the appearance features include a full body color histogram, an upper body color histogram, a lower body color histogram, feature points, patches, textures, a face, 3D Body parts, Haar wavelets, a histogram of ordered gradients, and covariance matrices.

7. The method of claim 5, wherein the trajectory features include a tracklet length in frames, a tracklet gap in frames, and tracklet similarity.

8. The method of claim 5, wherein the motion features include motion continuity in image plane, motion continuity in ground plane, and repetitive motion matching.

9. The method of claim 5, wherein the activity features include scene closed world interactions, and scene semantic hotspot interactions.

10. The method of claim 1, wherein the prior probability distribution of multi-person identity assignments for the current image frame in the video sequence given the set of feature measurements from all previous image frames in the video sequence is a probability of all multi-person identity assignment combinations given the set of feature measurements from all previous image frames.

11. The method of claim 10, further comprising:
   determining an optimal multi-person identity assignment in each frame of a subsequence of frames in the video sequence from an identity assignment combination with a maximum posterior probability in each frame;
   forming a trajectory for a single identified person over consecutive frames in the subsequence of frames from identified persons with a same identity assignment in each frame;
   analyzing the maximum posterior probability in each frame, wherein if the maximum posterior probability for a single identified person is lower than a predetermined threshold in a frame, the trajectory for that single identified person is cut from that frame into shorter tracklets; and
   jointly analyzing all tracklets in the subsequence of frames to link those tracklets into longer trajectories to obtain final tracking results.

12. The method of claim 11, wherein jointly analyzing all tracklets in the subsequence of frames to link those tracklets into longer trajectories comprises:
   maximizing linking scores of tracklets in the subsequence of frames to associate each pedestrian tracking hypothesis corresponding to a single trajectory,
   wherein said linking score $P_{link}$ for two tracklets $T_i$, $T_j$ is defined as $$P_{link}(T_i,T_j)=A_m(T_i,T_j)A_t(T_i,T_j)A_{appr}(T_i,T_j),$$

wherein $A_m$ represents a motion model defined by $A_m(T_i,T_j)=G(x_i^{tail}+v_i^{tail}\Delta t-x_j^{head},\sigma)G(x_j^{head}-v_j^{head}\Delta t-x_i^{tail},\sigma)$, wherein $\Delta t$ is the time gap between a tail of $T_i$ and a head of $T_j$, G is a zero-mean Gaussian distribution with standard deviation $\sigma$, $x_i$, $x_j$ and $v_i$, $v_j$ are positions and velocities of the head part or tail part of $T_i$ and $T_j$, respectively,
   $A_t$ represent a time model defined by $$A_t(T_i, T_j) = \begin{cases} 1, & \text{if } \Delta t > 0, \\ 0, & \text{otherwise,} \end{cases}$$

wherein a link between $T_i$ and $T_j$ is possible if the tail of $T_i$ appears earlier than the head of $T_j$, and
   $A_{appr}$ represents an appearance model defined by $A_{appr}(T_i,T_j)=Corr(Color(x_i^{tail}),Color(x_j^{head}))$, wherein Corr is a correlation coefficient of two color histograms Color extracted from the tail of $T_i$ and the head of $T_j$ respectively.

13. A system for tracking pedestrians in a video sequence, wherein each image frame of the video sequence corresponds to a time step, comprising:
   a megapixel camera connected to a backend of a network video recorder;
   a control center connected to the network video recorder that provides an image control interface to view and access the video sequence, and that parallelizes the video sequence received from the megapixel camera into parallel video streams that correspond to different subregions of a state space viewed by the megapixel camera; and
   a plurality of local track processing units, each said local track processing unit associated with a different subregion of the state space, each said local track processing unit executing a computer readable program of instructions tangibly embodied in one or more non-transitory computer readable program storage devices, said computer readable program of instructions adapted to perform method steps for tracking pedestrians in the associated subregion of the state space through the video sequence,
   wherein the method for tracking pedestrians in the associated subregion of the state space through the video sequence includes the steps of:
   using marginal space learning to sample a prior probability distribution of multi-person identity assignments for a current image frame in the video sequence given a set of feature measurements from image frames for all previous time steps in the video sequence;

using marginal space learning to estimate an observation likelihood distribution of the set of features for the current image frame given a set of multi-person identity assignments for the current image frame sampled from the prior probability distribution of multi-person identity assignments;

calculating a posterior probability distribution of multi-person identity assignments for the current image frame from the observation likelihood distribution for the current image frame and the prior probability distribution for the current image frame;

using marginal space learning to estimate the prior probability distribution of multi-person identity assignments for a next image frame in the video sequence given the posterior probability distribution of multi-person identity assignments for the current image frame and a probability $p(x_{t+1}|x_t)$ of multi-person identity assignments for the next image frame given the multi-person identity assignments of the current image frame, wherein said posterior probability distribution of multi-person identity assignments corresponds to a set of pedestrian detection hypotheses for the video sequence.

14. A non-transitory program storage device readable by a computer, tangibly embodying a program of instructions executed by the computer to perform the method steps for tracking pedestrians in a video sequence, wherein each image frame of the video sequence corresponds to a time step, the method comprising:

using marginal space learning to sample a prior probability distribution of multi-person identity assignments for a current image frame in the video sequence given a set of feature measurements from all previous image frames in the video sequence;

using marginal space learning to estimate an observation likelihood distribution of the set of features for the current image frame given a set of multi-person identity assignments for the current image frame sampled from the prior probability distribution of multi-person identity assignments for the current image frame;

calculating a posterior probability distribution of multi-person identity assignments for the current image frame from the observation likelihood distribution for the current image frame and the prior probability distribution for the current image frame; and using marginal space learning to estimate the prior probability distribution of multi-person identity assignments for a next image frame in the video sequence given the posterior probability distribution of multi-person identity assignments for the current image frame and a probability $p(x_{t+1}|x_t)$ of multi-person identity assignments for the next image frame given the multi-person identity assignments of the current image frame, wherein said posterior probability distribution of multi-person identity assignments corresponds to a set of pedestrian detection hypotheses for the video sequence.

15. The computer readable program storage device of claim 14, wherein marginal space learning comprises:

generating an initial hypothesis for a first subset of features for localizing a pedestrian in an image frame of the video sequence;

providing said initial hypothesis and said image frame to a first classifier trained to detect the first subset of features, wherein the output of the first classifier is a first probability distribution function for localizing said pedestrian in said image frame;

restricting the first probability distribution function to regions of highest probability for localizing said pedestrian; and providing said restricted first probability distribution function and said image frame to a second classifier trained to detect a second subset of features, wherein a search space for the second classifier is a Cartesian product of a search space associated with the restricted first probability distribution function and a search space of the second subset of features.

16. The computer readable program storage device of claim 15, wherein each classifier is a probabilistic boosting tree.

17. The computer readable program storage device of claim 15, wherein each classifier is part of an ordered sequence of classifiers, wherein a probability distribution output from a previous classifier in the ordered sequence of classifiers is restricted to a most probable regions before being provided to a subsequent classifier in the ordered sequence of classifiers, and a search space for each subsequent classifier is a Cartesian product of a search space associated with the restricted probability distribution of the previous classifier and a search space of the subset of features associated with the subsequent classifier.

18. The computer readable program storage device of claim 14, wherein features include appearance features, trajectory features, motion features, and activity features.

19. The computer readable program storage device of claim 18, wherein the appearance features include a full body color histogram, an upper body color histogram, a lower body color histogram, feature points, patches, textures, a face, 3D Body parts, Haar wavelets, a histogram of ordered gradients, and covariance matrices.

20. The computer readable program storage device of claim 18, wherein the trajectory features include a tracklet length in frames, a tracklet gap in frames, and tracklet similarity.

21. The computer readable program storage device of claim 18, wherein the motion features include motion continuity in image plane, motion continuity in ground plane, and repetitive motion matching.

22. The computer readable program storage device of claim 18, wherein the activity features include scene closed world interactions, and scene semantic hotspot interactions.

23. The computer readable program storage device of claim 14, wherein the prior probability distribution of multi-person identity assignments for the current image frame in the video sequence given the set of feature measurements from all previous image frames in the video sequence is a probability of all multi-person identity assignment combinations given the set of feature measurements from all previous image frames.

24. The computer readable program storage device of claim 23, the method further comprising:

determining an optimal multi-person identity assignment in each frame of a subsequence of frames in the video sequence from an identity assignment combination with a maximum posterior probability in each frame;

forming a trajectory for a single identified person over consecutive frames in the subsequence of frames from identified persons with a same identity assignment in each frame;

analyzing the maximum posterior probability in each frame, wherein if the maximum posterior probability for a single identified person is lower than a predetermined threshold in a frame, the trajectory for that single identified person is cut from that frame into shorter tracklets; and jointly analyzing all tracklets in the subsequence of frames to link those tracklets into longer trajectories to obtain final tracking results.

25. The computer readable program storage device of claim 24, wherein jointly analyzing all tracklets in the subsequence of frames to link those tracklets into longer trajectories comprises:

maximizing linking scores of tracklets in the subsequence of frames to associate each pedestrian tracking hypothesis corresponding to a single trajectory, wherein said linking score $P_{link}$ for two tracklets $T_i$, $T_j$ is defined as $P_{link}(T_i,T_j)=A_m(T_i, T_j)A_t(T_i, T_j)A_{appr}(T_iT_j)$, wherein $A_m$ represents a motion model defined by
$A_m(T_i,T_j)=G(x_i^{tail}+v_i^{tail}\Delta t-x_j^{head},\sigma)G(x_j^{head}-v_j^{head}\Delta t-x_i^{tail}, \sigma)$, wherein $\Delta t$ is the time gap between a tail of $T_i$ and a head of $T_j$, G is a zero-mean Gaussian distribution with standard deviation $\sigma$, $x_i$, $x_j$ and $v_i$, $v_j$ are positions and velocities of the head part or tail part of $T_i$ and $T_j$, respectively, $A_t$ represent a time model defined by $$A_t(T_i, T_j) = \begin{cases} 1, & \text{if } \Delta t > 0, \\ 0, & \text{otherwise,} \end{cases}$$

wherein a link between $T_i$ and $T_j$ is possible if the tail of $T_i$ appears earlier than the head of $T_j$, and $A_{appr}$ represents an appearance model defined by
$A_{app}(T_i,T_j)=Corr(Color(x_i^{tail}), Color(x_j^{head}))$, wherein Corr is a correlation coefficient of two color histograms Color extracted from the tail of $T_i$ and the head of $T_j$ respectively.

* * * * *